UNITED STATES PATENT OFFICE.

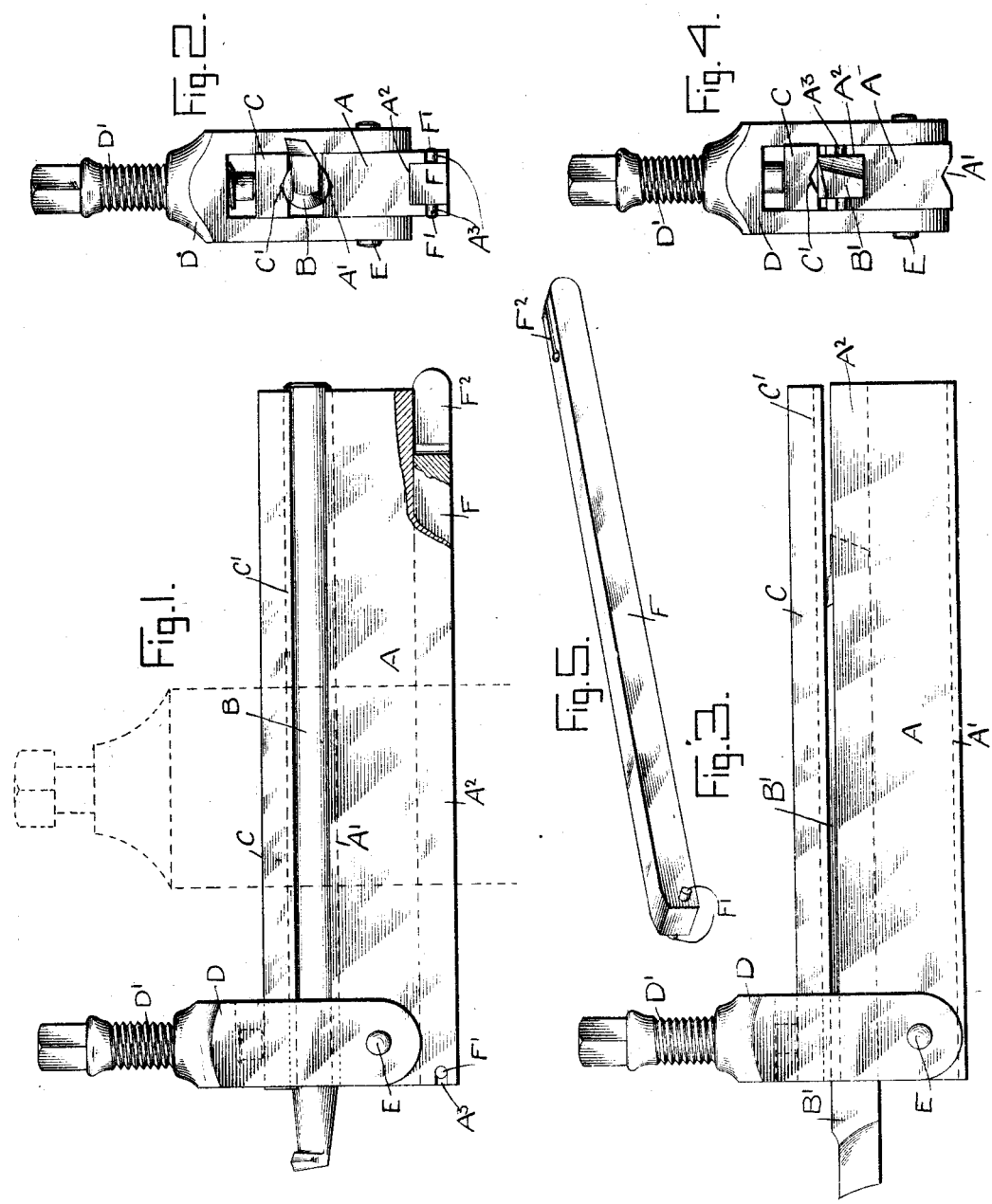

HENRY CURTIN, OF GLOVERSVILLE, NEW YORK.

TOOL-HOLDER.

1,068,221.

Specification of Letters Patent.

Patented July 22, 1913.

Application filed January 6, 1913. Serial No. 740,399.

*To all whom it may concern:*

Be it known that I, HENRY CURTIN, a citizen of the United States, and a resident of Gloversville, in the county of Fulton and State of New York, have invented a new and Improved Tool-Holder, of which the following is a full, clear, and exact description.

The invention relates to lathes, and its object is to provide a new and improved tool holder arranged to readily accommodate different forms and sizes of turning, forming or boring tools, and to permit of securely fastening the desired tool in place.

For the purpose mentioned, use is made of a stock having seats along each edge for the reception of a round shank boring tool at one seat, and a square shank turning tool at the other seat, a clamping bar adapted to overlie the tool used at the time, and a clamping yoke pivoted on the forward end of the stock and adapted to be swung around to extend over the clamping bar in either position thereof and to securely clamp the clamping bar in position on the tool.

A practical embodiment of the invention is represented in the accompanying drawings forming a part of this specification, in which similar characters of reference indicate corresponding parts in all the views.

Figure 1 is a side elevation of the tool holder with a boring tool in position, parts being shown in section; Fig. 2 is an elevation of the front end of the tool holder; Fig. 3 is a side elevation of the tool holder with a turning tool in position therein; Fig. 4 is an elevation of the front end of the same; and Fig. 5 is a perspective view of the filling bar.

A stock A in the form of a rectangular bar is provided on one edge with a V-shaped groove A′ and at the other edge with a channel A², the groove and channel extending from one end of the stock to the other end thereof. The round shank B of a boring tool is adapted to be seated in the V-shaped groove A′ and the top of the said round shank is adapted to be seated in a V-shaped groove C′ formed in the under side of a clamping bar C overlying the shank B, as plainly indicated in Figs. 1 and 2. The clamping bar C is engaged on top by a screw D′ screwing in a yoke D held on a transverse pivot E arranged in the forward end of the stock A intermediate the bottom of the groove A′ and the bottom of the channel A². By providing the V-shaped grooves A′ and C′ in the stock A and in the clamping bar C, round shanks B of different diameters can be readily accommodated, and on screwing down the screw D′ the clamping bar C firmly clamps the shank B in position on the stock A.

The channel A² is filled with a filling bar F while using a round shank boring tool so that the tool holder can be readily set into and clamped in the tool post of a lathe or a similar machine. When it is desired to use the tool holder for holding a turning or forming tool having a rectangular shank B′, as shown in Figs. 3 and 4, then the filling bar F is removed from the channel A² and the said shank B′ of the turning tool is placed into the channel A². When the turning or forming tool is used, the yoke D is swung around from the position it previously had, as shown in Figs. 1 and 2, so that the screw D′ engages the clamping bar C overlying the shank B′, fitting into the channel A², as shown in Figs. 3 and 4. It will be noticed that the height of the shank B′ is somewhat in excess of the depth of the channel A² so that the clamping bar C readily overlies the shank B′, and on screwing up the screw D′ the clamping bar C is firmly pressed into contact with the top of the shank B′ to securely hold the turning or forming tool in position in the tool holder. It is understood that in either case the tool holder is placed into a tool post of the usual construction and fastened therein, as indicated in dotted lines in Fig. 1.

It will be noticed that in the construction disclosed in Figs. 1 and 2, the filling bar F completely fills the channel A² so as to provide practically a solid stock to prevent injury to the side members of the channel when clamping the tool holder in position in the tool post.

In order to hold the filling bar F removably in position in the channel A², the forward end of the filling bar is provided on opposite sides with lugs F′ engaging slots A³ in the side walls of the channel, and the rear end of the filling bar F is provided with a lengthwise extending slit F² to form spring members clampingly engaging the inner surfaces of the side walls of the channel A² to properly hold the filling bar F in position in the channel A² and to allow removal of the said filling bar whenever it is desired to use the channel A² for the reception of the shank B' of a turning or forming tool.

The tool holder shown and described is very simple and durable in construction and is arranged to accommodate different sizes of round shank boring tools and different forms of turning or forming tools, as above described.

Having thus described my invention, I claim as new and desire to secure by Letters Patent:

1. A tool holder, comprising a stock, provided along one edge with a V-shaped groove and at its other edge with a channel, a clamping bar having a V-shaped groove in its under side and operating in conjunction with the grooved edge of the stock to clamp a round shank boring tool between the stock and clamping bar, a clamping yoke pivoted on the said stock and adapted to be swung around to extend over the said grooved edge or the said channel edge, and clamping means carried by the clamping yoke for engaging the said clamping bar.

2. A tool holder, comprising a stock having a seat along each edge for the reception of a round shank boring tool at one seat and a square shank turning tool at the other seat, a clamping bar adapted to overlie the tool used at a time and having a seat along its under side, and a clamping yoke pivoted on the forward end of the stock and adapted to be swung around to extend over the clamping bar in either position thereof, the said clamping yoke having a clamping screw screwing in the top of the yoke and abutting against the said clamping bar.

3. A tool holder, comprising a stock, provided along one edge with a V-shaped groove and at its other edge with a channel, a clamping bar operating in conjunction with the grooved edge of the stock to clamp a round shank boring tool between the stock and clamping bar, a clamping yoke pivoted on the said stock and adapted to be swung around to extend over the said grooved edge or the said channel edge, a filling bar for removable engagement with the said channel, and means for holding the said filling bar in position in the channel.

4. A tool holder, comprising a stock provided along one edge with a V-shaped groove and at its other edge with a channel, a clamping bar operating in conjunction with the grooved edge of the stock to clamp a round shank boring tool between the stock and clamping bar, a clamping yoke pivoted on the said stock and adapted to be swung around to extend over the said grooved edge or the said channel edge, and a filling bar for removable engagement with the said channel, one end of the filling bar being split to form spring members adapted to clampingly engage the side walls of the said channel, and the other end of the filling bar being provided with lugs, and the said stock being provided in the side walls of the said channel with slots for receiving the said lugs.

5. In a tool holder, a stock provided with a seat along one edge for the reception of a round shank boring tool, and a seat in the form of a channel along the other edge for the reception of a square shank turning tool, means for clamping either of said tools in position in its seat, and a filling bar for filling said channel while using a round shank boring tool, the said filling bar preventing injury to the side members of the channel when clamping the tool holder in position in a tool post, and means for holding the filling bar removably in position in the said channel.

In testimony whereof I have signed my name to this specification in the presence of two subscribing witnesses.

HENRY CURTIN.

Witnesses:
HANNA E. WARD,
R. DOUGLAS BOYD.

---

Copies of this patent may be obtained for five cents each, by addressing the "Commissioner of Patents, Washington, D. C."